United States Patent [19]

Kubo

[11] 4,164,241

[45] Aug. 14, 1979

[54] BLEED SCREW CAP

[75] Inventor: Takaaki Kubo, Kawasaki, Japan

[73] Assignee: Tokico Ltd., Kawasaki, Japan

[21] Appl. No.: 852,968

[22] Filed: Nov. 18, 1977

[30] Foreign Application Priority Data

Nov. 27, 1976 [JP] Japan .......................... 51-158681[U]
Nov. 30, 1976 [JP] Japan .......................... 51-160213[U]

[51] Int. Cl.² .............................................. F16K 27/12
[52] U.S. Cl. .................................. 137/377; 137/800; 188/352
[58] Field of Search ............... 137/377, 800; 188/352; 184/88 A

[56] References Cited

U.S. PATENT DOCUMENTS 3,332,515 7/1967 Borah ............................. 184/88 A
3,913,619 10/1975 Aulner, Sr. et al. ............ 188/352 X

*Primary Examiner*—Gerald A. Michalsky
*Attorney, Agent, or Firm*—Wenderoth, Lind & Ponack

[57] ABSTRACT

A cap of resilient material such as rubber or the like has a generally cup-shaped form for covering at least the head portion of a bleed screw which is mounted on a body of a hydraulic component such as a hydraulic actuator or the like to normally close an air bleed passage formed in the component. The cap comprises a generally cylindrical skirt portion depending integrally from the cup-shaped portion to abut with the surface of the body of the hydraulic component, and a projection formed on the inner circumference of the cap for engaging with a small diameter portion formed on the bleed screw, whereby the lower end of the skirt portion is urged resiliently against the body of the hydraulic component.

5 Claims, 3 Drawing Figures

BLEED SCREW CAP

BACKGROUND OF THE INVENTION

This invention relates to a cap for preventing ingress of dust, water or the like into a bleed screw normally closing a bleed passage formed in a body of hydraulic component such as a master cylinder, wheel cylinder, actuator or the like.

Conventionally, the bleed screw is mounted on the body of the hydraulic component with a portion thereof projecting to the outside of the body, and only the head portion thereof wherein one end of bleed hole opens is covered by a cap having a generally cup-shaped form. Thus, the portion projecting to the outside and not being covered by the cap is exposed to the atmosphere and suffers from corrosion or the like according to dust or water accumulating thereon. Further, water or the like will ingress through the screw-threaded portion of the bleed screw into the valve portion, thus causing such portions to rust so that loosening the bleed screw during a bleeding operation will become difficult and breakage failure of the bleed screw or the screw-threaded portion of the hydraulic component will sometimes occur upon loosening the bleed screw.

SUMMARY OF THE INVENTION

An object of the present invention is to provide a bleed screw cap covering the entire portion of the bleed screw exposed to the atmosphere ad resiliently engaging with the body of hydraulic component, thereby preventing the shortcomings aforementioned.

BRIEF DESCRIPTION OF THE DRAWINGS

Three embodiments of the present invention are shown in the drawings, in which.

DETAILED DESCRIPTION OF THE PREFERRED EMBODIMENTS

Figure 1:
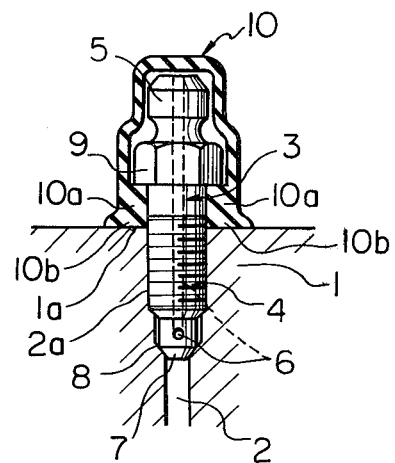
FIG. 1 is a cross-sectional view of a cap according to the present invention covering a bleed screw attached to a body of a hydraulic component.

In FIG. 1, an air bleed passage 2 is formed in a body 1 of a hydraulic component such as a master cylinder, wheel cylinder, actuator or the like. A bleed screw 3 threadingly engages with screw thread portion 2a formed in the outer end portion of the passage 2. An air bleed hole 6 extends longitudinally from the upper end portion 5 of the screw 3, and the lower end of the hole 6 opens radially in a small diameter portion of the screw 3 formed beneath the screw thread portion 4 of the screw 3. Normally, a valve portion 7 formed on the lower end of the screw 3 engages with a valve seat 8 formed in the passage 2 to close the passage 2.

During an air bleeding operation, the screw 3 is rotated to separate the valve portion 7 from the valve seat 8 so as to communicate the interior of the hydraulic component 1 with the atmosphere through the passage 2 and the hole 6. A suitable tool such as a spanner (not shown) engaging with a hexagonally shaped tightening portion 9 formed on the screw 3 at a position thereof between the head portion 5 and the screw thread portion 4 is utilized to rotate the screw 3. The tightening portion may be formed to have any suitable configuration other than a hexagon, but it has a diameter larger than that of the screw thread portion 4.

A cap 10 formed of a resilient material such as rubber, synthetic resin or the like according to the present invention covers the screw 3. The upper portion of the cap 10 covers the head portion 5 of the screw 3, and an annular projection 10a is formed on the inner periphery of the open end (the lower end in the drawing) of the cap 10 to resiliently engage with the tightening portion 9 of the screw 3 and with the outer surface 1a of the body 1 surrounding the open end of the screw thread portion 2a of the bleed passage 2. To this end, the annular projection 10a is formed to have a height or axial thickness larger than the clearance between the lower surface of the tightening portion 9 and the outer surface 1a of the body 1 by a small amount, so that the lower end or the open end portion 10b of the cap 10 is resiliently and tightly urged against the surface 1a of the body 1 by a compressive force stored in the annular projection 10a of the cap 10.

The cap 10 can easily be removed from the screw 3 by resiliently deforming the projection 10 so as to be disengaged from the tightening portion 9, particularly, by spreading the pulling upward and the lower end portion 10b. In mounting the cap 10 on the bleed screw 3, the cap 10 is fitted on the screw 3 with the lower end portion 10b being spread while in passing over the tightening portion 9. Thereafter, the lower end portion 10b is pressed radially inwardly until the annular projection 10a engages resiliently with the lower surface of the tightening portion 9 and the surface portion 1a.

Figure 2:
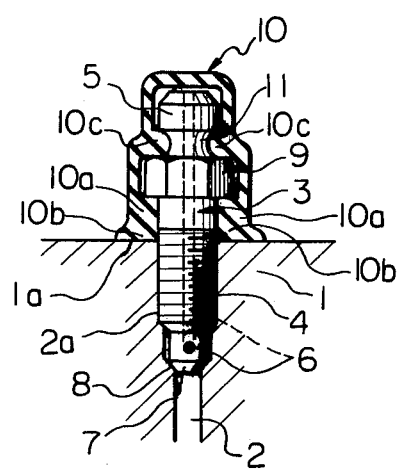
FIG. 2 is a view similar to FIG. 1 but showing a second embodiment of the present invention.

FIG. 2 shows a second embodiment of the present invention, in which cap 10 is modified to have another annular projection 10c on the inner periphery so as to engage a neck portion 11 formed between the head portion 5 and the tightening portion 9. The cap 10 of the second embodiment can be mounted on the screw 3 more reliably than that of the first embodiment, although the assembling and disassembling operations are more troublesome.

Figure 3:
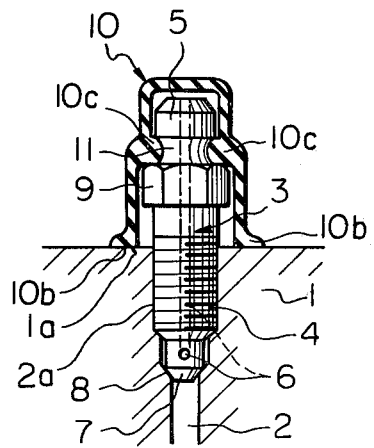
FIG. 3 is a similar view showing a third embodiment of the present invention.

FIG. 3 shows another embodiment of the present invention, generally similar to the second embodiment, but with the annular projection 10a being omitted. In this embodiment, the projection 10c engaging with the small diameter neck portion 11 of the screw 3 formed between the head portion 5 and the tightening portion 9 acts to retain the cap 10 on the screw 3 and also to resiliently urge the lower end portion 10b against the surface portion 1a. The axial length or the height between the projection 10c and the lower end portion 10b of the cap 10 is so determined that the lower end portion 10b is resiliently urged against the surface portion 1a when the cap 10 is mounted on the screw 3 as shown in the drawing. Although the force acting between the end portion 10b and the surface portion 1a in this embodiment is usually smaller than in the first and second embodiments, it is sufficient to prevent ingress of dust, water or the like. It will be clear that the assembling or disassembling operations can be performed very easily as compared with the preceding embodiments.

As described heretofore in detail, the cap according to the invention completely covers a portion of the bleed screw projecting from the outside surface of the body of the hydraulic component, thus, any dust or water is prevented from attaching onto the bleed screw, and a projection formed on the inner circumference of the cap engages with the bleed screw so that the cap is retained in its position by the resiliency of the cap.

The open end or the lower end portion of the cap is resiliently urged against the outer surface portion of the body of the hydraulic component surrounding the bleed screw by resiliency or compressive force stored in the material of the cap, thus, ingress of water can be prevented and rust will not be formed on screw thread engaging portions.

In the illustrated embodiments, the projections 10a and 10c have an annular or a continuous ring-like shape, but if desired, it is possible to form each or either of such projections from two more angularly spaced, circumferentially extending arcuate sections.

What is claimed is:

1. A hydraulic bleeding assembly comprising:
a hydraulic component having therein an air bleed passage;
a bleed screw mounted on and extending from said hydraulic component, said bleed screw including an inner screw threaded portion threaded into said air bleed passage, a polygonal tool engaging portion extending outwardly and spaced from an outer surface of said hydraulic component and having a size larger than the diameter of said screw threaded portion, an outer head portion, and a neck portion between said tool engaging portion and said head portion, said neck portion having a diameter smaller than said head portion and said tool engaging portion; and
a cap of resilient material such as rubber completely covering all portions of said bleed screw which extend outwardly from said hydraulic component, said cap including a generally cup-shaped closed outer end portion covering said head portion of said bleed screw, a generally cylindrical leg portion integral with and depending from said outer end portion and loosely covering said tool engaging portion, an inwardly extending annular projection tightly engaging said neck portion of said bleed screw, and said leg portion having an open inner end which resiliently engages said outer surface of said hydraulic component.

2. An assembly as claimed in claim 1, wherein said inner end of said leg portion includes a radially outwardly extending annular flange engaging said outer surface of said hydraulic component.

3. An assembly as claimed in claim 1, wherein said cup-shaped outer end portion of said cap loosely covers said head portion of said bleed screw.

4. An assembly as claimed in claim 1, wherein said leg portion loosely covers a portion of said screw threaded portion of said bleed screw which is between said outer surface of said hydraulic component and said tool engaging portion of said bleed screw.

5. An assembly as claimed in claim 1, wherein the length of said cap between said annular projection and said inner end of said leg portion is greater than the distance between said neck portion of said bleed screw and said outer surface of said hydraulic component.

* * * * *